United States Patent [19]

Tatsuno

[11] Patent Number: 4,950,055
[45] Date of Patent: Aug. 21, 1990

[54] RETROFOCUS TYPE WIDE ANGLE LENS

[75] Inventor: Wataru Tatsuno, Tokyo, Japan

[73] Assignee: Nikon Corporation, Tokyo, Japan

[21] Appl. No.: 386,259

[22] Filed: Jul. 28, 1989

[30] Foreign Application Priority Data

Aug. 12, 1988 [JP] Japan .................................. 63-201077

[51] Int. Cl.$^5$ .............................................. G02B 13/04
[52] U.S. Cl. ................................................... 350/462
[58] Field of Search .............................. 350/458–462, 350/465

[56] References Cited

U.S. PATENT DOCUMENTS

| | | | |
|---|---|---|---|
| 4,113,358 | 3/1978 | Nakagawa | 350/462 |
| 4,311,367 | 1/1982 | Mori | 350/462 X |

FOREIGN PATENT DOCUMENTS

| | | | |
|---|---|---|---|
| 54-44519 | 4/1979 | Japan | 3650/462 |
| 55-147607 | 11/1980 | Japan | . |

*Primary Examiner*—Scott J. Sugarman
*Attorney, Agent, or Firm*—Shapiro and Shapiro

[57] ABSTRACT

A retrofocus type wide angle lens is characterized by a first lens group consisting of a meniscus-shaped negative lens whose convex surface is directed toward an object, a second lens group consisting of a biconvex and a negative lens cemented thereto, a third lens group consisting of a biconcave lens, a fourth lens group consisting of a meniscus-shaped positive lens whose convex surface is directed to an image and fifth lens group consisting of a biconvex lens all of which are arranged in the order named from an object side and is further characterized in that the following relations are satisfied $1.3 < f_2/f_{2p} < 2$
$0.18 < n_3 - n_4 < 0.3$
$-0.35 < d_2/f_1 < -0.15$
$0.2 < (d_3 + d_4)/f < 0.5$
$0.14 < d_5/f < 0.2$
$-0.3 < r_3/r_5 < 0.2$ where
f = the focal length of the whole system;
$f_1$ = the focal length of the first lens group;
$f_2$ = the focal lens of the second lens group;
$f_{2p}$ = the focal length of the positive lens in the second lens group;
$n_3$, $n_4$ = the refractive indices of the positive and negative lenses, respectively, in the second lens group;
$d_2$ = the distance between the first and second lens groups;
$d_3$, $d_4$ = the thickness of the positive and negative lenses, respectively, in the second lens group;
$d_5$ = the distance between the second and third lens groups; and
$r_3$, $r_5$ = the radii of curvature of the surface nearest to the object side and the surface nearest to the image side, respectively, of the second lens group.

8 Claims, 1 Drawing Sheet

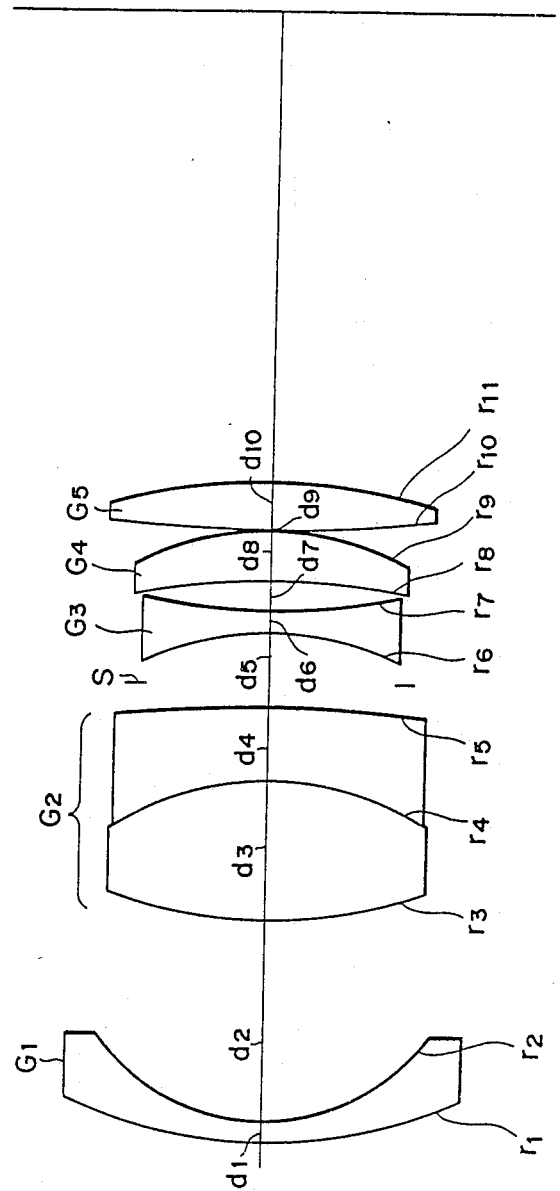

RETROFOCUS TYPE WIDE ANGLE LENS

BACKGROUND OF THE INVENTION

1. Field of the Invention

The present invention relates to a retrofocus type wide angle lens and more particularly a retrofocus type wide angle lens which is simple in construction yet has a high f number.

2. Related Background Art

As wide angle lenses for single-reflex cameras, various types each of which consists of five negative, positive, nagative, positive and positive groups arranged in the order from an object and which have f number of the order of 2.8 have been devised and demonstrated. Of the wide angle lenses, the wide angle lens whose f number is improved is disclosed in, for instance, U.S. Pat. No. 4,113,358 and the wide angle lens which consists of five groups and five elements or five groups and six elements in order to decrease the number of elements as practically as possible, thereby making the lens light in weight is disclosed in Laid-Open Japanese patent application No. 55-147607.

However, in the case of the wide angle lens disclosed in U.S. Pat. No. 4,113,358, it is made compact in size while attaining an f number of the order of 2.0, but in the case of the lens having such a high f number, the lens elements are increased to seven constituting five groups and furthermore the first group which has the largest diameter consists of cemented elements so that from the standpoint of making the lens light in weight, such arrangement is disadvantageous. The reason is that the focal length of a positive lens cemented in the second group is short. In the case of such arrangement, if the first group consists of one element, it becomes extremely difficult to correct higher orders of spherical aberration, causing flare. Moreover in order to correct higher orders of spherical aberration, the correction of aberration is made on the first group so that the correction of distortion becomes unsatisfactory.

In the case of the wide angle lens disclosed in the above-mentioned Laid-Open Japanese patent application, it can attain the highest f number of the order of 2.0, but the overall length of the lens is relatively longer so that the wide angle lens cannot be said compact in size. The reason is that in order to attain the highest f number of 2.0, the lens system is enlarged so that the correction of spherical aberration and coma aberration may be made satisfactorily.

As described above, in the cases of the conventional wide angle lenses, there exists the problem that in order to make a lens compact in size yet attain the highest f number of the order of 2.0, the lens elements must be increased in number or in order to decrease the number of lens elements while retaining the highest f number of the order of 2.0, the lens system must be enlarged.

SUMMARY OF THE INVENTION

In view of the above, the primary object of the present invention is to provide a high performance retrofocus type wide angle lens which can overcome the above and other problems encountered in the conventional retrofocus type wide angle lenses and which consists of five groups and six elements so that it is compact in size and yet attain the highest f number of the order of 2.0.

To attain the above and other ends, the retrofocus type wide angle lens in accordance with the present invention is characterized by a first lens group consisting of a meniscus-shaped negative lens whose convex surface is directed toward an object, a second lens group consisting of a biconvex and a negative lens cemented thereto, a third lens group consisting of a biconcave lens, a fourth lens group consisting of a meniscus-shaped positive lens whose convex surface is directed to an image and a fifth lens group consisting of a biconvex lens all of which are arranged in the order named from an object side and is further characterized in that the following relations are satisfied $$1.3 < f_2/f_{2p} < 2$$
$$0.18 < n_3 - n_4 < 0.3$$
$$-0.35 < d_2/f_1 < -0.15$$
$$0.2 < (d_3 + d_4)/f < 0.5$$
$$0.14 < d_5/f < 0.2$$
$$-0.3 < r_3/r_5 < 0.2$$

where
- $f$ = the focal length of the whole system;
- $f_1$ = the focal length of the first lens group;
- $f_2$ = the focal lens of the second lens group;
- $f_{2p}$ = the focal length of the positive lens in the second lens group;
- $n_3, n_4$ = the refractive indices of the positive and negative lenses, respectively, in the second lens group;
- $d_2$ = the distance between the first and second lens groups;
- $d_3, d_4$ = the thickness of the positive and negative lenses, respectively, in the second lens group;
- $d_5$ = the distance between the second and third lens groups; and
- $r_3, r_5$ = the radii of curvature of the surface nearest to the object side and the surface nearest to the image side, respectively, of the second lens group.

That is, according to the present invention, the second group $G_2$ consists of two cemented positive and negative lenses which are relatively greatly different in refractive index while maintaining suitable thickness of the positive and negative lenses so that the correction of spherical aberration, distortion, Petzval sum and so on can be made with a sufficient margin. As a result, while retaining the highest f number 2.0, the whole length of the lens system is shortened.

The present invention can therefore provide a retrofocus type wide angle lens which is bright and has a wide angle of view and is made compact in size while maintaining a high degree of image focusing capability.

The above and other objects, effects, features and advantages of the present invention will become more apparent from the detailed description of embodiments thereof taken in conjunction with the accompanying drawings.

BRIEF DESCRIPTION OF THE DRAWINGS

A single FIGURE illustrates the construction of from a first to a fourth preferred embodiment of the present invention.

DESCRIPTION OF THE PREFERRED EMBODIMENTS

Now with reference to the single FIGURE, the preferred embodiments of the present invention will be described.

As shown in the single FIGURE, a retrofocus type wide angle lens in accordance with the present invention comprises a first lens group $G_1$ consisting of a meniscus-shaped negative lens whose convex surface is directed toward an object, a second lens group $G_2$ consisting of a biconvex lens and a negative lens cemented with each other, a third lens group $G_3$ consisting of a biconcave lens, a fourth lens group $G_4$ consisting of a meniscus-shaped positive lens whose convex surface is directed toward an image and a fifth lens group $G_5$ consisting of a biconvex lens and satisfies the following conditions:

$$1.3 < f_2/f_{2p} < 2 \quad (1)$$
$$0.18 < n_3 - n_4 < 0.3 \quad (2)$$
$$-0.35 < d_2/f_1 < -0.15 \quad (3)$$
$$0.2 < (d_3 + d_4)/f < 0.5 \quad (4)$$
$$0.14 < d_5/f < 0.2 \quad (5)$$
$$-0.3 < r_3/r_5 < 0.1 \quad (6)$$

where
- $f_2$: the focal length of the second lens group $G_2$;
- $f_{2p}$: the focal length of the positive lens in the second lens group $G_2$;
- $n_3$: refractive index of the positive lens in the second lens group $G_2$;
- $n_4$: the refractive index of the negative lens in the second lens group $G_2$;
- $d_2$: the distance between the first and second lens group $G_1$ and $G_2$;
- $f_1$: the focal length of the first lens group $G_1$;
- $d_3$: the thickness of the positive lens in the second lens group $G_2$;
- $d_4$: the thickness of the negative lens in the second lens group $G_2$;
- $f$: the focal length of the whole system;
- $d_5$: the distance between the second and third lens groups $G_2$ and $G_3$;
- $r_3$: the radius of curvature of the surface of the second lens group $G_2$ closest to an object; and
- $r_5$: the radius of curvature of the surface of the second lens group $G_2$ closest to an image.

Next the above-mentioned conditions (1)–(6) will be described in more detail hereinafter.

First the condition (1) is required in order to satisfactorily correct the spherical aberration while maintaining the whole system compact in size and defines a suitable ratio between the focal length of the second lens group $G_2$ and the focal length of the biconvex positive lens $f_{2p}$. When the ratio is in excess of the upper limit, the high order spherical aberrations and coma are increased so that it becomes difficult to maintain the f number 2.0. On the other hand, when the ratio drops below the lower limit, spherical aberration and coma are also increased, causing flare. It is preferable that the upper limit of the condition (1) is 1.8.

Meanwhile, in the cases of the large aperture lenses, various aberrations must be corrected while sagittal coma is also taken into consideration. To this end, according to the preferred embodiments of the present invention, in order to maintain the whole system compact in size while sagittal coma and spherical aberrations are satisfactorily corrected and a satisfactory Petzval sum is maintained, the difference $(n_3-n_4)$ in refractive index between the positive and negative lenses of the second lens group $G_2$ is made relatively great.

The second condition (2) therefore defines the difference in refractive index. When the difference is in excess of the upper limit, not only a satisfactory Petzval sum cannot be maintained but also it becomes difficult to correct chromatic aberrations. On the other hand, when the difference drops below the lower limit, it becomes difficult to correct various aberrations including sagittal coma while maintaining the whole system compact in size. It is preferable that the lower limit of the condition (2) is 0.23.

The condition (3) defines a suitable ratio between the distance $d_2$ between the first and second lens groups $G_1$ and $G_2$ on the one hand and the focal length $f_1$ of the first lens group $G_1$ on the other hand and is an essential condition for maintaining a satisfactory back focus while satisfactorily correcting distortions. When the ratio is in excess of the upper limit, it becomes difficult to obtain a satisfactory back focus and on the other hand when the ratio drops below the lower limit, distortion is increased and furthermore it becomes difficult to satisfactorily correct coma.

In order to make the lens system compact in size, not only the thickness of lenses but also the distances between the lens groups must be decreased as practically possible. Therefore in the preferred embodiments of the present invention, as shown in the single FIGURE, the distance $d_2$ between the first and second lens groups $G_1$ and $G_2$; the thickness $(d_3+d_4)$ of the lenses in the second lens group $G_2$ and the distance $d_5$ between the second and third lens groups $G_2$ and $G_5$ are shortened as practically possible so that the whole system can be made compact in size.

However in order to secure a suitable back focus described in the condition (3), the distance $d_2$ between the first and second lens groups $G_1$ and $G_2$ cannot be shortened too much. Therefore in the preferred embodiments of the present invention, while maintaining the balance among corrections of aberrations, an optimum thickness $(d_3+d_4)$ of the lenses in the second lens group $G_2$ and an optimum distance $d_5$ between the second and third lens groups $G_2$ and $G_3$ are defined so that the lens system can be made compact in size.

Therefore an optimum thickness $(d_3+d_4)$ of the lenses in the second lens group $G_2$ is defined in the condition (4). When the thickness is in excess of the upper limit of the condition (4), the whole system becomes large in size, which is not preferable from the standpoint of the objects of the present invention. On the other hand, when the thickness drops below the lower limit, coma is increased and the variation in coma due to an angle of view becomes greater so that it becomes difficult to correct coma in the lens system succeeding the second lens group $G_2$.

The condition (5) defines a suitable distance $d_5$ between the second and third lens groups $G_2$ and $G_3$. When the difference is in excess of the upper limit of the condition (5), the lens system is increased in length and the effective diameter of the first lens group $G_1$ is also increased, which is contrary to one of the objects of the present invention to make a lens system compact in size. On the other hand, when the difference drops below the lower limit, it becomes difficult to correct coma and spherical aberrations.

The condition (6) defines an optimum ratio between the radius of curvature $r_3$ of the surface on the side of an object of the second lens group $G_2$ and the radius of curvature $r_5$ of the surface on the side of an image of the second lens group $G_2$. This condition is necessary to satisfactorily correct increased aberrations, especially coma and spherical aberrations, resulting from the design for making the whole optical system compact in size. When the ratio is in excess of the upper limit of the condition (6), even though astigmatism is relatively decreased, it becomes difficult to satisfactorily correct spherical aberrations and high order coma and at the same time distortion is increased. It is not preferable that the ratio drops below the lower limit because spherical aberrations cannot be satisfactorily corrected while coma is increased.

Furthermore, in order to maintain the whole system compact in size and to satisfactorily correct various aberrations, the following conditions must be further satisfied.

$$0.4 < \frac{r_8 - r_9}{r_8 + r_9} < 0.6 \tag{7}$$

$$-0.6 < r_{11}/r_{10} < 0 \tag{8}$$

$$1.15 < \Sigma d/f < 1.45 \tag{9}$$

where $r_8$: the radius of curvature of the surface nearest to an object of the fourth lens group $G_4$;

$r_9$: the radius of curvature of the surface nearest to an image of the fourth lens group $G_4$;

$r_{10}$: the radius of curvature of the surface nearest to an object of the fifth lens group $G_5$;

$r_{11}$: the radius of curvature of the surface nearest to an image of the fifth lens group $G_5$: and $\Sigma d$: the distance along the optical axis from the vertex of the surface nearest to an object of the first lens group $G_1$ and the vertex of the surface nearest to an image of the fifth lens group $G_5$.

The condition (7) concerns the shape of the fourth lens group $G_4$ and is required to be satisfied in order to satisfactorily correct mainly coma. When the ratio is in excess of the upper limit defined by the condition (7), it becomes difficult to satisfactorily correct coma while maintaining the lens system compact in size. On the other hand, when the ratio drops below the lower limit, it becomes difficult to correct the variations in coma due to an angle of view. It is preferable that the upper limit of the condition (7) is 0.55.

The condition (8) defines an optimum ratio between the radius of curvature of the surface on the side of an object of the fifth lens group $G_5$ and the radius of curvature of the surface on the side of an image of the lens group $G_5$ and is required to satisfactorily correct coma and distortion. When the ratio is in excess of the upper limit defined by the condition (8), it becomes difficult to satisfactorily correct coma. On the other hand, when the ratio drops below the lower limit, the back focus is shortened while distortion is increased.

The condition (9) defines an optimum overall length of the lens system so that the latter can be made compact in size. It is not preferable that the ratio is in excess of the upper limit of the condition (9) because one of the objects of the present invention to make the lens system compact in size cannot be attained. On the other hand, when the ratio drops below the lower limit, it becomes difficult to satisfactorily correct various aberrations such as spherical aberrations, coma and so on.

The data of the first, second, third and fourth embodiments of the present invention are shown in Tables 1, 2, 3 and 4, respectively. Each embodiment is a retrofocus type wide angle lens which is compact in size and can attain the angle of view $2\omega = 62°$ and the f number of 2.0 at the focal length of 100.

The first, second, third and fourth embodiments are substantially similar in lens construction to the wide angle lens shown in the single FIGURE and a stop is interposed between the second and third lens groups $G_2$ and $G_3$.

In the Tables 1-4, the numbers in the leftmost column indicate the sequence from an object; r, the radius of curvature of the surface of each lens; d, the distance between the lenses; and Abbe number $\gamma$ and the refractive index n are obtained with respect to D line ($\lambda = 587.6$ nm).

Furthermore, FN represents an f number; $\beta$, a magnification; and DO, the distance from the vertex of the surface of the first lens to an object.

The values which satisfy the conditions (1)–(9) in the first, second, third and fourth embodiments are shown in Table 5.

TABLE 1

First Embodiment
f = 100.0 FN = 2.0 2ω = 62.0°

| | r | d | ν | n |
|---|---|---|---|---|
| 1 | 110.686 | 4.17 | 60.3 | 1.51835 |
| 2 | 46.073 | 44.44 | | |
| 3 | 99.235 | 30.56 | 47.5 | 1.78797 |
| 4 | −69.916 | 15.28 | 51.3 | 1.52682 |
| 5 | −421.337 | 16.67 | | |
| 6 | −67.959 | 5.28 | 25.4 | 1.80518 |
| 7 | 168.899 | 6.11 | | |
| 8 | −181.557 | 11.11 | 52.3 | 1.74810 |
| 9 | −62.926 | 0.28 | | |
| 10 | 358.952 | 10.00 | 53.9 | 1.71300 |
| 11 | −132.497 | (Bf) | | | f = 100.008    β = −0.033    β = −0.176
DO ∞           3002.709      570.383
Bf 105.441     108.774       123.052
$f_2$ = 82.579,  $f_{2p}$ = 55.558,  $f_1$ = −155.694

TABLE 2

Second Embodiment
f = 100.0 FN = 2.0 2ω = 62.0°

| | r | d | ν | n |
|---|---|---|---|---|
| 1 | 103.131 | 4.17 | 64.1 | 1.51680 |
| 2 | 45.480 | 44.44 | | |
| 3 | 97.364 | 25.00 | 47.5 | 1.78797 |
| 4 | −71.128 | 15.28 | 49.0 | 1.53172 |
| 5 | −731.193 | 16.67 | | |
| 6 | −70.736 | 5.28 | 25.4 | 1.80518 |
| 7 | 162.090 | 6.11 | | |
| 8 | −188.504 | 11.11 | 52.3 | 1.74810 |
| 9 | −62.684 | 0.28 | | |
| 10 | 333.753 | 10.00 | 53.9 | 1.71300 |
| 11 | −137.441 | (Bf) | | | f = 100.009    β = −0.033    β = −0.176
DO ∞           3003.875      571.711
Bf 105.682     109.016       123.295
$f_2$ = 84.381,  $f_{2p}$ = 55.811,  $f_1$ = −161.405

TABLE 3

Third Embodiment
f = 100.0 FN = 2.0 2ω = 62.0°

| | r | d | ν | n |
|---|---|---|---|---|
| 1 | 80.955 | 4.17 | 64.1 | 1.51680 |
| 2 | 42.532 | 44.44 | | |
| 3 | 92.894 | 22.22 | 45.4 | 1.79668 |
| 4 | −68.160 | 5.56 | 49.0 | 1.53172 |
| 5 | −3713.600 | 16.67 | | |
| 6 | −75.481 | 5.28 | 25.4 | 1.80518 |
| 7 | 138.401 | 6.11 | | |
| 8 | −176.882 | 11.11 | 52.3 | 1.74810 |
| 9 | −61.969 | 0.28 | | |
| 10 | 366.252 | 10.00 | 55.6 | 1.69680 |
| 11 | −132.623 | (Bf) | | | f = 100.008    β = −0.033    β = −0.176
DO ∞           3008.598      576.270

TABLE 3-continued

Third Embodiment
f = 100.0  FN = 2.0  2ω = 62.0°

| Bf 105.269 | 108.602 | 122.880 |
|---|---|---|
| $f_2 = 82.149$, | $f_{2p} = 52.563$, | $f_1 = -180.057$ |

TABLE 4

Fourth Embodiment
f = 100.0  FN = 2.0  2ω = 62.0°

| | r | d | ν | n |
|---|---|---|---|---|
| 1 | 79.244 | 4.17 | 69.9 | 1.51860 |
| 2 | 40.656 | 38.89 | | |
| 3 | 89.566 | 19.44 | 45.4 | 1.79668 |
| 4 | −67.455 | 5.56 | 45.9 | 1.54814 |
| 5 | 2808.694 | 16.67 | | |
| 6 | −90.951 | 5.28 | 25.4 | 1.80518 |
| 7 | 126.125 | 6.11 | | |
| 8 | −168.059 | 11.11 | 52.3 | 1.74810 |
| 9 | −61.940 | 0.28 | | |
| 10 | 313.415 | 10.00 | 55.6 | 1.69680 |
| 11 | −144.889 | (Bf) | | |

| f = 100.004 | β = −0.033 | β = −0.176 |
|---|---|---|
| D0 ∞ | 3014.015 | 581.482 |
| Bf 105.591 | 108.924 | 123.202 |
| $f_2 = 82.939$, | $f_{2p} = 51.101$, | $f_1 = -167.162$ |

TABLE 5

Values satisfying the conditions (1)–(9)

| Embodiment | $\frac{f_2}{f_{2p}}$ | N | $\frac{d_2}{f_1}$ | $\frac{d_3 + d_4}{f}$ | $\frac{d_5}{f}$ | $\frac{r_3}{r_5}$ | $\frac{r_8 - r_9}{r_8 + r_9}$ | $\frac{r_{11}}{r_{10}}$ | $\frac{\Sigma d}{f}$ |
|---|---|---|---|---|---|---|---|---|---|
| 1 | 1.460 | 0.261 | −0.285 | 0.458 | 0.167 | −0.236 | 0.485 | −0.369 | 1.439 |
| 2 | 1.512 | 0.256 | −0.275 | 0.403 | 0.167 | −0.133 | 0.501 | −0.412 | 1.383 |
| 3 | 1.563 | 0.265 | −0.247 | 0.278 | 0.167 | −0.025 | 0.481 | −0.362 | 1.258 |
| 4 | 1.623 | 0.249 | −0.233 | 0.250 | 0.167 | 0.031 | 0.461 | −0.462 | 1.170 | where $N = n_3 - n_4$

Each of the retrofocus type wide angle lenses in accordance with the present invention described above is simple in construction consisting of five groups and six elements, is compact in size, has a relatively high f number covering a great angle of view.

What is claimed is:

1. A five group, six element, retrofocus type wide angle lens comprising a first lens group consisting of a meniscus-shaped negative lens whose convex surface is directed toward an object side, a second lens group consisting of a biconvex lens and a negative lens cemented therewith, a third lens group consisting of a biconcave lens, a fourth lens group consisting of a meniscus-shaped positive lens whose convex surface is directed toward an image side and a fifth lens group consisting of a biconvex lens all of which are arranged in the order named from said object side and satisfy the following conditions:

$$1.3 < f_2/f_{2p} < 2 \quad (1)$$
$$0.18 < n_3 - n_4 < 0.3 \quad (2)$$
$$-0.35 < d_2/f_1 < -0.15 \quad (3)$$
$$0.2 < (d_3 + d_4)/f < 0.5 \quad (4)$$
$$0.14 < d_5/f < 0.2 \quad (5)$$
$$-0.3 < r_3/r_5 < 0.1 \quad (6)$$

where
f: the focal length of the whole system;
$f_1$: the focal length of the first lens group;
$f_2$: the focal length of the second lens group;
$f_{2p}$: the focal length of the positive lens in the second lens group;
$n_3$: the refractive index of the positive lens in the second lens group;
$n_4$: the refractive index of the negative lens in the second lens group;
$d_2$: the distance between the first and second lens groups;
$d_3$: the thickness of the positive lens in the second lens group;
$d_4$: the thickness of the negative lens in the second lens group;
$d_5$: the distance between the second and third lens groups;
$r_3$: the radius of curvature of the surface nearest to said object side of said second lens group; and
$r_5$: the radius of curvature of the surface nearest to said image side of the second lens group.

2. A retrofocus type wide angle lens as set forth in claim 1, wherein the following conditions are satisfied $$1.3 < f_2/f_{2p} \leq 1.8 \text{ and}$$
$$0.23 \leq n_3 - n_4 < 0.3.$$

3. A retrofocus type wide angle lens as set forth in claim 1, wherein the following further conditions are satisfied $$0.4 < (r_8 - r_9)/(r_8 + r_9) < 0.6 \quad (7)$$
$$-0.6 < r_{11}/r_{10} < 0 \quad (8)$$

and $$1.15 < \Sigma d/f < 1.45 \quad (9)$$

where
$r_8$: the radius of curvature of the surface nearest to the object side of the fourth lens group;
$r_9$: the radius of curvature of the surface nearest to the image side of the fourth lens group;
$r_{10}$: the radius of curvature of the surface nearest to the object side of said fifth lens group;
$r_{11}$: the radius of curvature of the surface nearest to the image side of said fifth lens group; and
$\Sigma d$: the length along the optical axis from the vertex of the surface nearest to the object side of the first lens group to the vertex of the surface nearest to the image side of said fifth lens group.

4. A retrofocus type wide angle lens as set forth in claim 3, wherein the following condition is satisfied $$0.4 < (r_8 - r_9)/(r_8 + r_9) \leq 0.55.$$

5. A retrofocus type wide angle lens as set forth in claim 1 constructed in accordance to the following data:

| f = 100.0 FN = 2.0 2ω = 62.0° | | | |
|---|---|---|---|
| r | d | ν | n |
| 1 | 110.686 | 4.17 | 60.3 | 1.51835 |
| 2 | 46.073 | 44.44 | | |
| 3 | 99.235 | 30.56 | 47.5 | 1.78797 |
| 4 | −69.916 | 15.28 | 51.3 | 1.52682 |
| 5 | −421.337 | 16.67 | | |
| 6 | −67.959 | 5.28 | 25.4 | 1.80518 |
| 7 | 168.899 | 6.11 | | |
| 8 | −181.557 | 11.11 | 52.3 | 1.74810 |
| 9 | −62.926 | 0.28 | | |
| 10 | 358.952 | 10.00 | 53.9 | 1.71300 |
| 11 | −132.497 | (Bf) | | |

| f = 100.008 | β = −0.033 | β = −0.176 |
|---|---|---|
| D0 ∞ | 3002.709 | 570.383 |
| Bf 105.441 | 108.774 | 123.052 |
| f₂ = 82.579, | f₂ₚ = 55.558, | f₁ = −155.694 | where
- FN: the f number
- 2ω: the angle of view
- r: the radius of curvature of the surface of each lens
- d: the distance between lenses
- γ: the Abbe number with respect to D line (λ=587.6 nm)
- n: the refractive index with respect to D line (λ=587.6 nm)
- β: the magnification
- DO: the distance from the vertex of the surface of the first lens to an object
- Bf: the back focus.

6. A retrofocus type wide angle lens as set forth in claim 1 constructed in accordance to the following data:

| f = 100.0 FN = 2.0 2ω = 62.0° | | | |
|---|---|---|---|
| r | d | ν | n |
| 1 | 103.131 | 4.17 | 64.1 | 1.51680 |
| 2 | 45.480 | 44.44 | | |
| 3 | 97.364 | 25.00 | 47.5 | 1.78797 |
| 4 | −71.128 | 15.28 | 49.0 | 1.53172 |
| 5 | −731.193 | 16.67 | | |
| 6 | −70.736 | 5.28 | 25.4 | 1.80518 |
| 7 | 162.090 | 6.11 | | |
| 8 | −188.504 | 11.11 | 52.3 | 1.74810 |
| 9 | −62.684 | 0.28 | | |
| 10 | 333.753 | 10.00 | 53.9 | 1.71300 |
| 11 | −137.441 | (Bf) | | |

| f = 100.009 | β = −0.033 | β = −0.176 |
|---|---|---|
| D0 ∞ | 3003.875 | 571.711 |
| Bf 105.682 | 109.016 | 123.295 |
| f₂ = 84.381, | f₂ₚ = 55.811, | f₁ = −161.405 | where
- FN: the f number
- 2ω: the angle of view
- r: the radius of curvature of the surface of each lens
- d: the distance between lenses
- γ: the Abbe number with respect to D line (λ=587.6 nm)
- n: the refractive index with respect to D line (λ=587.6 nm)
- β: the magnification
- DO: the distance from the vertex of the surface of the first lens to an object
- Bf: the back focus.

7. A retrofocus type wide angle lens as set forth in claim 1 constructed in accordance to the following data:

| f = 100.0 FN = 2.0 2ω = 62.0° | | | |
|---|---|---|---|
| r | d | ν | n |
| 1 | 80.955 | 4.17 | 64.1 | 1.51680 |
| 2 | 42.532 | 44.44 | | |
| 3 | 92.894 | 22.22 | 45.4 | 1.79668 |
| 4 | −68.160 | 5.56 | 49.0 | 1.53172 |
| 5 | −3713.600 | 16.67 | | |
| 6 | −75.481 | 5.28 | 25.4 | 1.80518 |
| 7 | 138.401 | 6.11 | | |
| 8 | −176.882 | 11.11 | 52.3 | 1.74810 |
| 9 | −61.969 | 0.28 | | |
| 10 | 366.252 | 10.00 | 55.6 | 1.69680 |
| 11 | −132.623 | (Bf) | | |

| f = 100.008 | β = −0.033 | β = −0.176 |
|---|---|---|
| D0 ∞ | 3008.598 | 576.270 |
| Bf 105.269 | 108.602 | 122.880 |
| f₂ = 82.149, | f₂ₚ = 52.563, | f₁ = −180.057 | where
- FN: the f number
- 2ω: the angle of view
- r: the radius of curvature of the surface of each lens
- d: the distance between lenses
- γ: the Abbe number with respect to D line (λ=587.6 nm)
- n: the refractive index with respect to D line (λ=587.6 nm)
- β: the magnification
- DO: the distance from the vertex of the surface of the first lens to an object
- Bf: the back focus.

8. A retrofocus type wide angle lens as set forth in claim 1 constructed in accordance to the following data:

| f = 100.0 FN = 2.0 2ω = 62.0° | | | |
|---|---|---|---|
| r | d | ν | n |
| 1 | 79.244 | 4.17 | 69.9 | 12.51860 |
| 2 | 40.656 | 38.89 | | |
| 3 | 89.566 | 19.44 | 45.4 | 1.79668 |
| 4 | −67.455 | 5.56 | 45.9 | 1.54814 |
| 5 | 2808.694 | 16.67 | | |
| 6 | −90.951 | 5.28 | 25.4 | 1.80518 |
| 7 | 126.125 | 6.11 | | |
| 8 | −168.059 | 11.11 | 52.3 | 1.74810 |
| 9 | −61.940 | 0.28 | | |
| 10 | 313.415 | 10.00 | 55.6 | 1.69680 |
| 11 | −144.889 | (Bf) | | |

| f = 100.004 | β = −0.033 | β = −0.176 |
|---|---|---|
| D0 ∞ | 3014.015 | 581.482 |
| Bf 105.591 | 108.924 | 123.202 |
| f₂ = 82.939, | f₂ₚ = 51.101, | f₁ = −167.162 | where
- FN: the f number
- 2ω: the angle of view
- r: the radius of curvature of the surface of each lens
- d: the distance between lenses
- γ: the Abbe number with respect to D line (λ=587.6 nm)
- n: the refractive index with respect to D line (λ=587.6 nm)
- β: the magnification
- DO: the distance from the vertex of the surface of the first lens to an object
- Bf: the back focus.

* * * * *